(12) United States Patent
Huang

(10) Patent No.: US 7,760,521 B2
(45) Date of Patent: Jul. 20, 2010

(54) HALF-BRIDGE RESONANT CONVERTER

(75) Inventor: Ming-Ho Huang, Taipei Hsien (TW)

(73) Assignee: Hipro Electronics Co., Taipei (TW)

( * ) Notice: Subject to any disclaimer, the term of this patent is extended or adjusted under 35 U.S.C. 154(b) by 861 days.

(21) Appl. No.: 11/652,118

(22) Filed: Jan. 11, 2007

(65) Prior Publication Data

US 2007/0291515 A1 Dec. 20, 2007

(30) Foreign Application Priority Data

Jun. 19, 2006 (TW) .............................. 95121870 A

(51) Int. Cl.
*H02M 3/335* (2006.01)
(52) U.S. Cl. .............................. 363/22; 363/23; 363/98; 363/132
(58) Field of Classification Search ................... 363/22, 363/23, 18, 19, 98, 132
See application file for complete search history.

(56) References Cited

U.S. PATENT DOCUMENTS

| | | | | |
|---|---|---|---|---|
| 5,049,788 A | * | 9/1991 | Lee | 315/219 |
| 5,268,830 A | * | 12/1993 | Loftus, Jr. | 363/17 |
| 5,303,137 A | * | 4/1994 | Peterson | 363/16 |
| 5,500,576 A | * | 3/1996 | Russell et al. | 315/307 |
| 5,962,987 A | * | 10/1999 | Statnic | 315/248 |
| 6,072,710 A | * | 6/2000 | Chang | 363/132 |
| 6,400,584 B1 | * | 6/2002 | Sabate et al. | 363/22 |
| 7,061,188 B1 | * | 6/2006 | Katyl et al. | 315/291 |
| 7,095,183 B2 | * | 8/2006 | Alexandrov | 315/224 |
| 7,193,866 B1 | * | 3/2007 | Huang | 363/22 |
| 7,362,594 B2 | * | 4/2008 | Tsui et al. | 363/22 |

* cited by examiner

*Primary Examiner*—Bao Q Vu
(74) *Attorney, Agent, or Firm*—Chun-Ming Shih; HDLS IPR Services

(57) ABSTRACT

A half-bridge resonant converter includes: a primary winding; a secondary winding having a first and a second end and a central point; a first electronic switch; a second electronic switch; a first power-storage element; a second power-storage element; and a load having a first and a second end. Wherein, the first end of said the secondary winding serially connects with said the first electronic switch and the first power-storage element, and the second end of said the secondary winding serially connects with said the second electronic switch and the second power-storage element, and the first end of said the load connects simultaneously with said the first power-storage element and the second power-storage element, and the second end connects with the central point of the secondary winding.

7 Claims, 8 Drawing Sheets

HALF-BRIDGE RESONANT CONVERTER

BACKGROUND OF THE INVENTION

1. Field of the Invention

The present invention relates to a voltage converter, and more particularly to a synchronization half-wave rectification converter reaches to zero voltage conversion and low power loss.

2. Descriptions of the Related Art

The conventional half-bridge converter utilizes two power switches for forward power conversion, which is applicable to a smaller transformer. The development objective of the half-bridge converter is to provide a high efficiency power adapter. The developed product of the power supply industry currently utilizes LLC resonance circuits to reduce loss of power conversion, and increases the efficiency of power conversion to reduce power loss.

Traditional converter uses the diode as the element of the electronic switch of the secondary circuit, but because the diode will generate a considerable power loss, the conversion efficiency of the converter can not be increased. Hence, improving the electronic switch of the secondary circuit to avoid tremendous power loss becomes the objective of technical development of the converter.

SUMMARY OF THE INVENTION

The objective of the present invention is to provide a voltage converter which uses a transistor instead of a diode as the electronic switch of the secondary side to reduce power loss in voltage conversion.

According to the above objective, the half-bridge resonant converter of the present invention includes a primary winding; a secondary winding having a first and a second end and a central point; a first electronic switch having a first and a second end, wherein the first end connects with the first end of the secondary winding; a second electronic switch having a first and a second end, wherein the first end connects with the second end of the secondary winding; a first power-storage element having a first and a second end, wherein the first end connects with the second end of the first electronic switch; a second power-storage element having a first and a second end, wherein the first end connects with the second end of the second electronic switch; and a load having a first and a second end, wherein the first end connects simultaneously with the second end of the first power-storage element and the second end of the second power-storage element, and the second end connects with the central point of the secondary winding.

The disposed power-storage element can prevent the electronic switch from excessive power loss due to reverse bias, and thus make the half-bridge resonant converter of the present invention reach the objective of lowest power loss.

The objectives or characteristics of the present invention will be described in detail according to the figures hereunder, however it should be understood that the figures hereunder or the exemplary embodiments are only for the purpose of description and do not mean to limit or shrink the scope of The present invention.

DESCRIPTION OF THE PREFERRED EMBODIMENTS

While the invention has been described by way of examples and in terms of preferred embodiments, it is to be understood that those who are familiar with the subject art can carry out various modifications and similar arrangements and procedures described in the present invention and also achieve the effectiveness of the present invention. Hence, it is to be understood that the description of the present invention should be accorded with the broadest interpretation to those who are familiar with the subject art, and the invention is not limited thereto.

Figure 1:
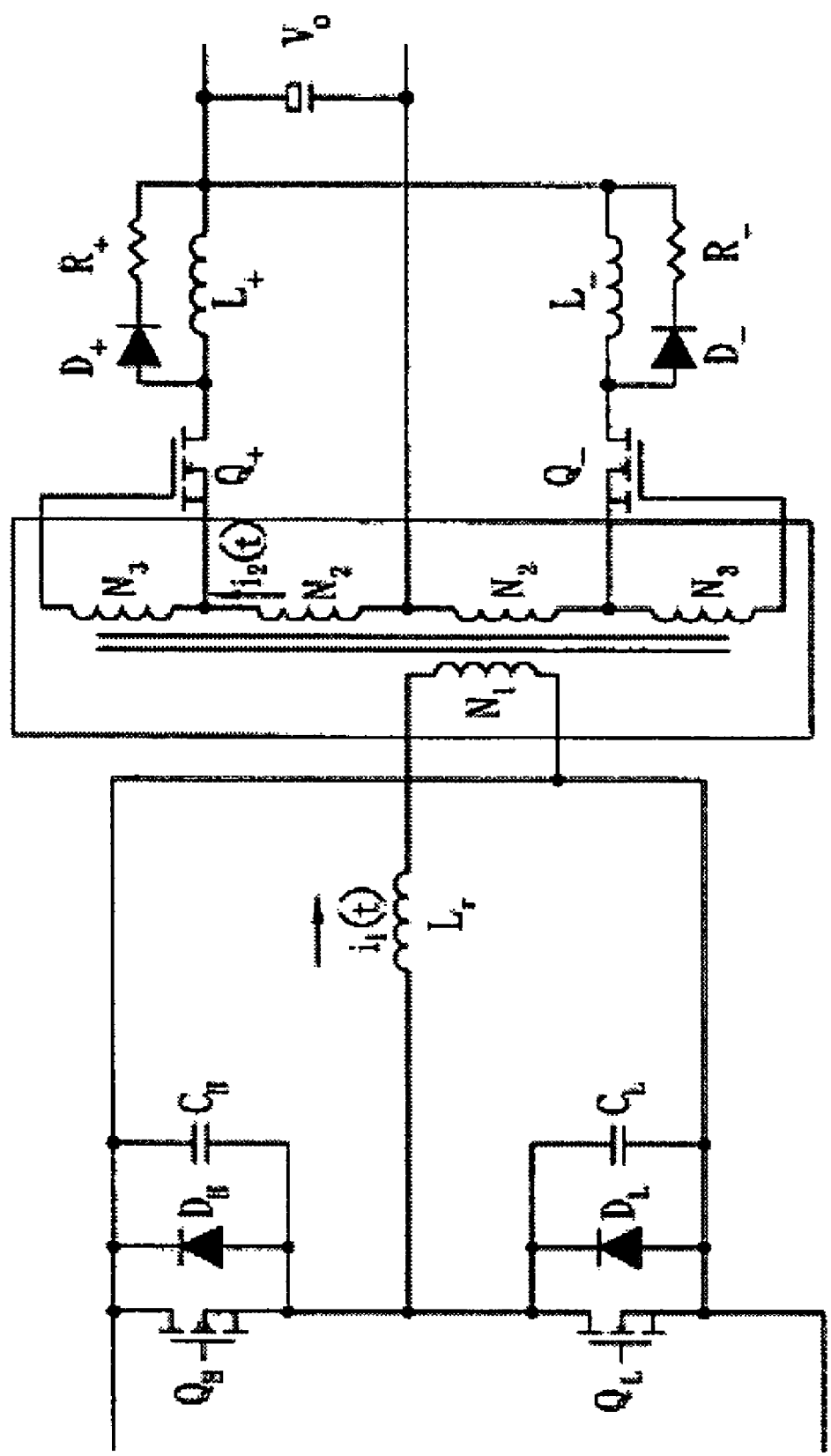
FIG. 1 is the circuit diagram of the half-bridge resonant converter of the present invention.

FIG. 1 shows the circuit diagram of the half-bridge resonant converter of the present invention, wherein the circuit includes: a primary winding; a secondary winding N2 having a first and a second end and a central point; a first electronic switch having a first and a second end, wherein the first end connects with the first end of the secondary winding; a second electronic switch having a first and a second end, wherein the first end connects with the second end of the secondary winding; a first power-storage element having a first and a second end, wherein the first end connects with the second end of the first electronic switch; a second power-storage element having a first and a second end, wherein the first end connects with the second end of the second electronic switch; and a load having a first and a second end, wherein the first end connects simultaneously with the second end of the first power-storage element and the second end of the second power-storage element, and the second end connects with the central point of the secondary winding.

The first electronic switch of the secondary winding is a combination of a MOSFET $Q_+$ and a winding $N_3$, and the second electronic switch is a combination of a MOSFET $Q_-$ and a winding $N_3$, so that the secondary winding can reach the objective of synchronizing rectification. The action of the first electronic switch is in the reverse of the second electronic switch, and causes the first end or the second end of the secondary winding to conduct the load alternatively to reach the objective of half-wave rectification. Moreover, the winding $N_3$ of the first electronic switch and the winding $N_3$ of the second electronic switch are the same windings of equal coil number.

The filter inductances $L_+$, $L_-$, are connected separately to the first electronic switch and the second electronic switch for rectifying the output current from the first electronic switch and the second electronic switch. The filter inductance $L_+$ is combined in parallel with a series of a diode $D_+$ and a resistance $R_+$ to form a first power-storage element, and he filter inductance $L_-$ is combined in parallel with a series of a diode $D_-$ and a resistance $R_-$ to form a second power-storage element for providing an power release route for the filter inductance $L_+$, $L_-$ to overcome the voltage drop between the output voltage $V_0$ of the load and the first end voltage $V'$ of the secondary winding.

Figure 2:
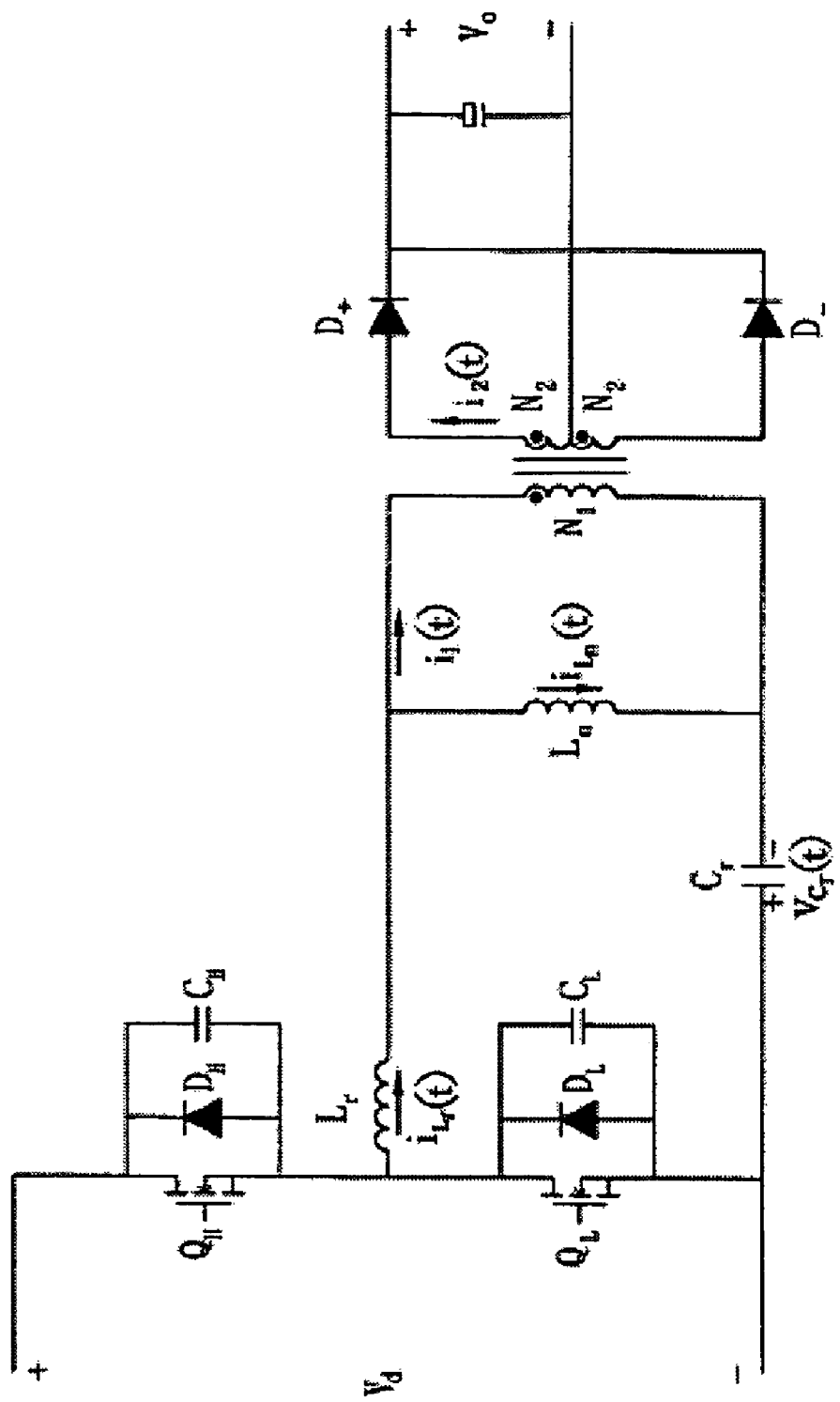
FIG. 2 is the circuit diagram of the conventional half-bridge resonant converter.

The present invention is to improve the power loss and the conversion efficiency of a conventional half-bridge converter. FIG. 2 shows the circuit structure diagram of a conventional half-bridge converter. The converter includes a primary side circuit and a secondary side circuit, wherein $V_d$ is the input voltage, and $V_0$ is the output measuring voltage, and coil number ratio between the primary winding $N_1$, and the secondary winding $N_2$ is $N=N_1/N_2$.

Figure 3:
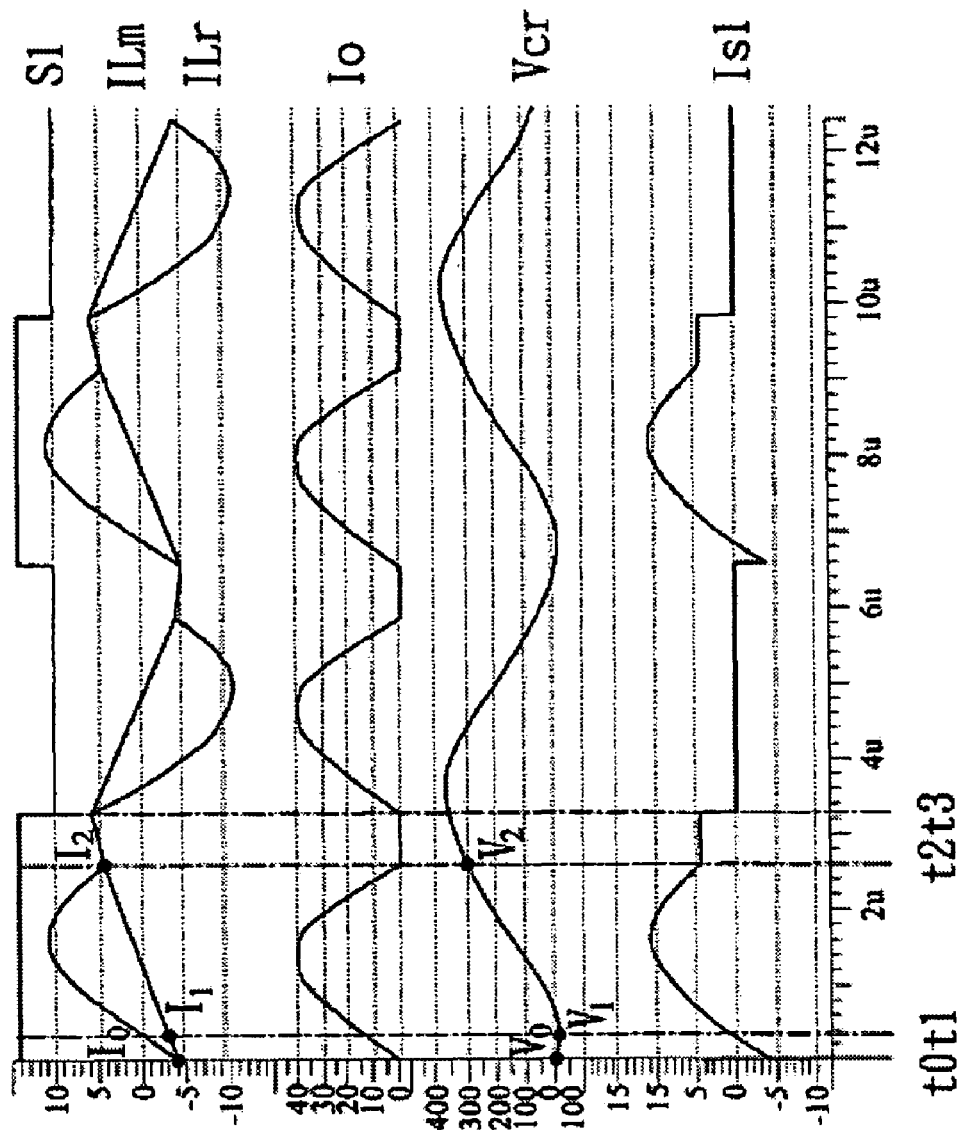
FIG. 3 is the current waveform of the conventional half-bridge resonant converter.

FIG. 3 shows the functioning waveform of the half-bridge converter. Because the first half-cycle and the second half-cycle of the converter are symmetrical working modes, therefore the half-bridge converter can be divided into the follows modes by the first half-cycle:

Mode 1: $(t_0 \sim t_1)$

Figure 4:
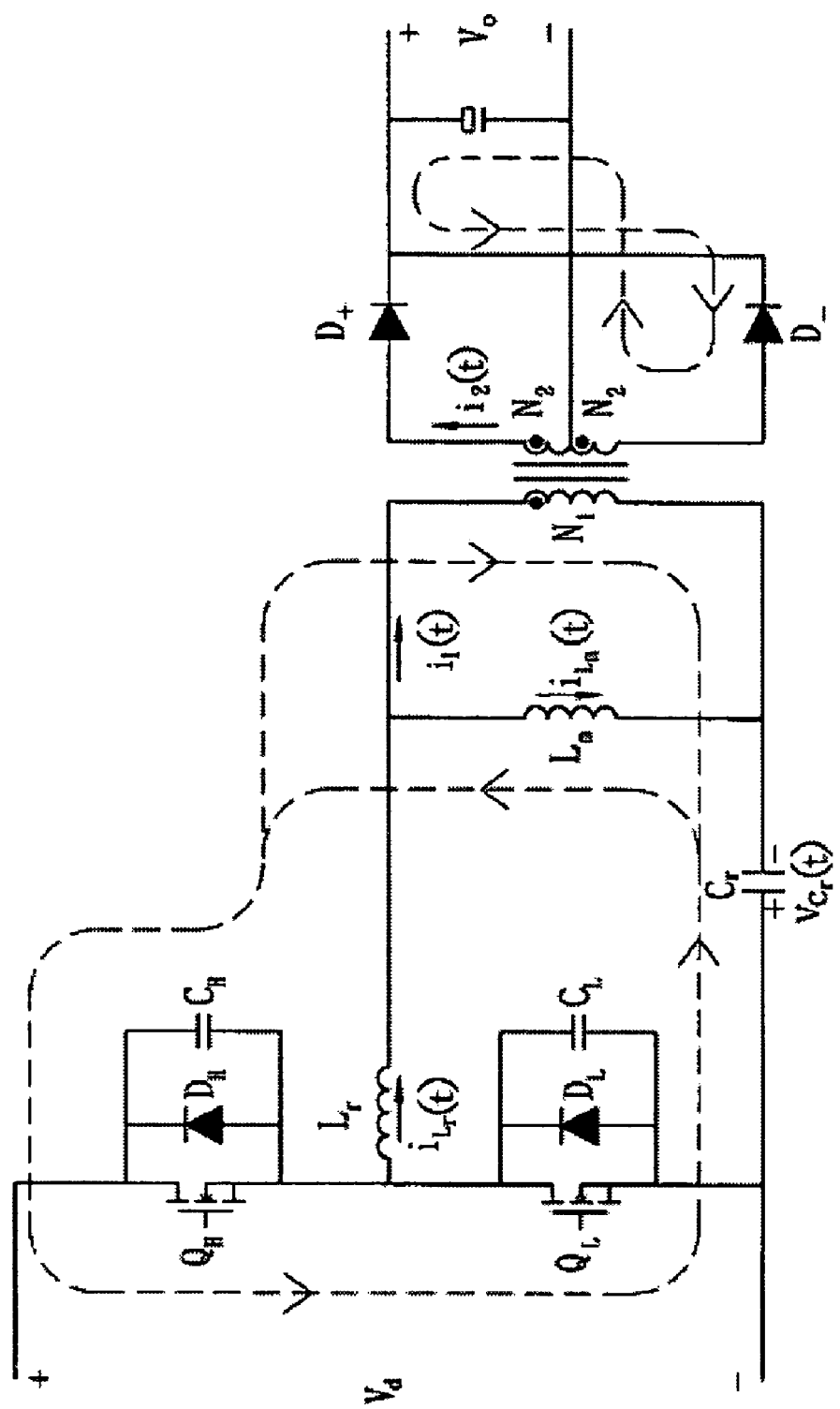
FIG. 4 is the current conduction circuit of the conventional half-bridge resonant converter in mode 1.

In the state of mode 1, the transistor $Q_H$ and $Q_L$ are all not conducted. The initial current of the resonant inductance $L_r$ and the magnetized inductance $L_m$ is initialized as $I_0$, and the initial voltage of the resonant capacitance $C_r$ is initialized as $V_0$. Because $I_0$ is smaller than 0, the current conductance waveform of $I_0$ is shown in FIG. 4. And because the bridged voltage of the magnetized inductance $L_m$ is fixed as $nV_o$, therefore the magnetized inductance $L_m$ can be deemed as a constant DC voltage source, as well as the resonant current $I_{Lr}$ and the resonant capacitance $C_r$ current are equal, thus obtains:

$$\begin{cases} L_r \dfrac{di_{Lr}(t)}{dt} + v_{C_r}(t) = \dfrac{V_d}{2} - nV_o \\ i_{Lr}(t_0) = I_0 \\ V_c(t_0) = V_0 \end{cases}$$

Further the current and the voltage equations of the resonant inductance $L_r$ and the resonant capacitance $C_r$ can be obtained as follows:

$$\begin{cases} i_{Lr}(t) = \left\{ I_0 \cos[\omega_{r1}(t-t_0)] + \dfrac{\dfrac{V_d}{2} - nV_o - V_0}{Z_{01}} \sin[\omega_{r1}(t-t_0)] \right\} u(t-t_0) \\ v_{C_r}(t) = \left\{ \dfrac{V_d}{2} - nV_o - \left(\dfrac{V_d}{2} - nV_o - V_0\right) \cos[\omega_{r1}(t-t_0)] + I_0 Z_{01} \sin[\omega_{r1}(t-t_0)] \right\} u(t-t_0) \end{cases}$$

According to the above equation, the current and the voltage waveform of the resonant inductance $L_r$ and the resonant capacitance $C_r$ from $t_0$ to $t_1$ can be obtained as shown in FIG. 3.

Wherein, as the magnetized inductance $L_m$ can be deemed as a constant DC voltage source, therefore the resonant inductance $L_r$ and the resonant capacitance $C_r$ of the primary side may be deemed as resonant, and the resonant frequency is as follows:

$$\omega_{r1} = \dfrac{1}{\sqrt{LrCr}}$$

and a characteristic resistance $Z_{01}$ can be obtained as follows:

$$Z_{01} = \sqrt{\dfrac{Lr}{Cr}}$$

while the current equation of the magnetized inductance $L_m$ can be derived as follows:

$$\begin{cases} L_m \dfrac{di_{Lm}(t)}{dt} = nV_o \\ i_{Lm}(t_0) = I_0 \end{cases} \Rightarrow i_{Lm}(t) = i_{Lm}(t_0) + \int_0^t \dfrac{nV_o}{L_m} d\tau$$

$$= I_0 + \dfrac{nV_o}{L_m}(t - t_0)$$

and the current slope of the magnetized inductance $L_m$ can be expressed as:

$$\text{Slope}(I_{Lm}) = \dfrac{n \cdot Vo}{Lm}$$

According to the above equation, the current waveform of the magnetized inductance $L_m$ from $t_0$ to $t_1$ can be obtained as shown in FIG. 3.

When the resonant current $I_{Lr}$ is larger than 0, the current direction of the resonant current $I_{Lr}$ is reversed, therefore the diode $D_H$ will be terminated, and then the working mode of the half-bridge converter will get into mode 2.

Mode 2: $(t_1 \sim t_2)$

Figure 5:
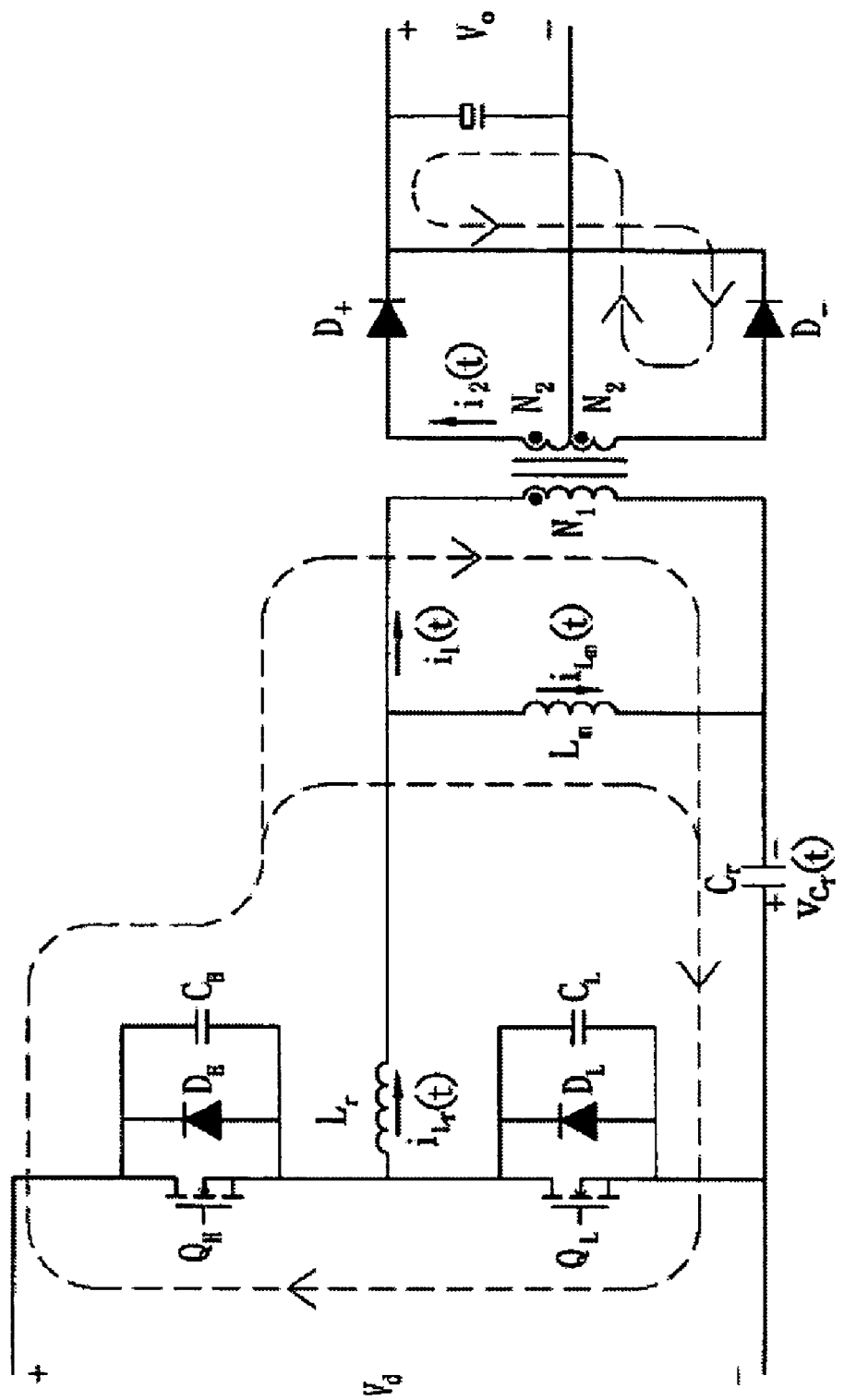
FIG. 5 is the current conduction circuit of the conventional half-bridge resonant converter in mode 2.

In the state of mode 2, as the resonant current $I_{Lr}$ is in reverse direction, therefore the transistor $Q_H$ is conducted and the current conductance waveform is shown in FIG. 5. The same with mode 1, the magnetized inductance $L_m$ can be deemed as a constant DC voltage source, as well as the resonant current $I_{Lr}$ and the resonant capacitance $C_r$ current are equal, thus obtains:

$$\begin{cases} L_r \dfrac{di_{Lr}(t)}{dt} + v_{C_r}(t) = \dfrac{V_d}{2} - nV_o \\ i_{Lr}(t_1) = 0 \\ V_c(t_1) = V_1 \end{cases}$$

Further the current and the voltage equations of the resonant inductance $L_r$ and the resonant capacitance $C_r$ can be obtained as follows:

$$\begin{cases} i_{Lr}(t) = \dfrac{\dfrac{V_d}{2} - nV_o - V_0}{Z_{01}} \sin[\omega_{r1}(t-t_1)] u(t-t_1) \\ v_{C_r}(t) = \left\{ \dfrac{V_d}{2} - nV_o - \left(\dfrac{V_d}{2} - nV_o - V_1\right) \cos[\omega_{r1}(t-t_1)] \right\} u(t-t_1) \end{cases}$$

According to the above equation, the current and the voltage waveform of the resonant inductance $L_r$ and the resonant capacitance $C_r$ from $t_1$ to $t_2$ can be obtained as shown in FIG. 3.

As well as the resonant frequency and characteristic resistance are the same as which in the state of mode 1:

$$\omega_{r1} = \frac{1}{\sqrt{LrCr}}, \quad Z_{01} = \sqrt{\frac{Lr}{Cr}}$$

and the equation of the magnetized inductance $L_m$ can be derived as follows:

$$\begin{cases} L_m \frac{di_{L_m}(t)}{dt} = nV_o \\ i_{L_m}(t_0) = I_1 \end{cases} \Rightarrow i_{L_m}(t) = i_{L_m}(t_1) + \int_0^t \frac{nV_o}{L_m} d\tau$$

$$= I_1 + \frac{nV_o}{L_m}(t - t_1)$$

and the slop of the magnetized inductance $L_m$ can be expressed as:

$$\text{Slope}(I_{Lm}) = \frac{n \cdot Vo}{Lm}$$

According to the above equation, the current waveform of the magnetized inductance $L_m$ from $t_1$ to $t_2$ can be obtained as shown in FIG. 3.

The current $I_2$ of the secondary side can not be reversed from the transistor polarity of the secondary side circuit, therefore the relative current $I_1$ of primary side shall not be smaller than 0. Hence the half-bridge converter will be get into mode 3 if the resonant current $I_{Lr}$ and the magnetized current $I_{Lm}$ are the same.

Mode 3: ($t_2 \sim t_3$)

Figure 6:
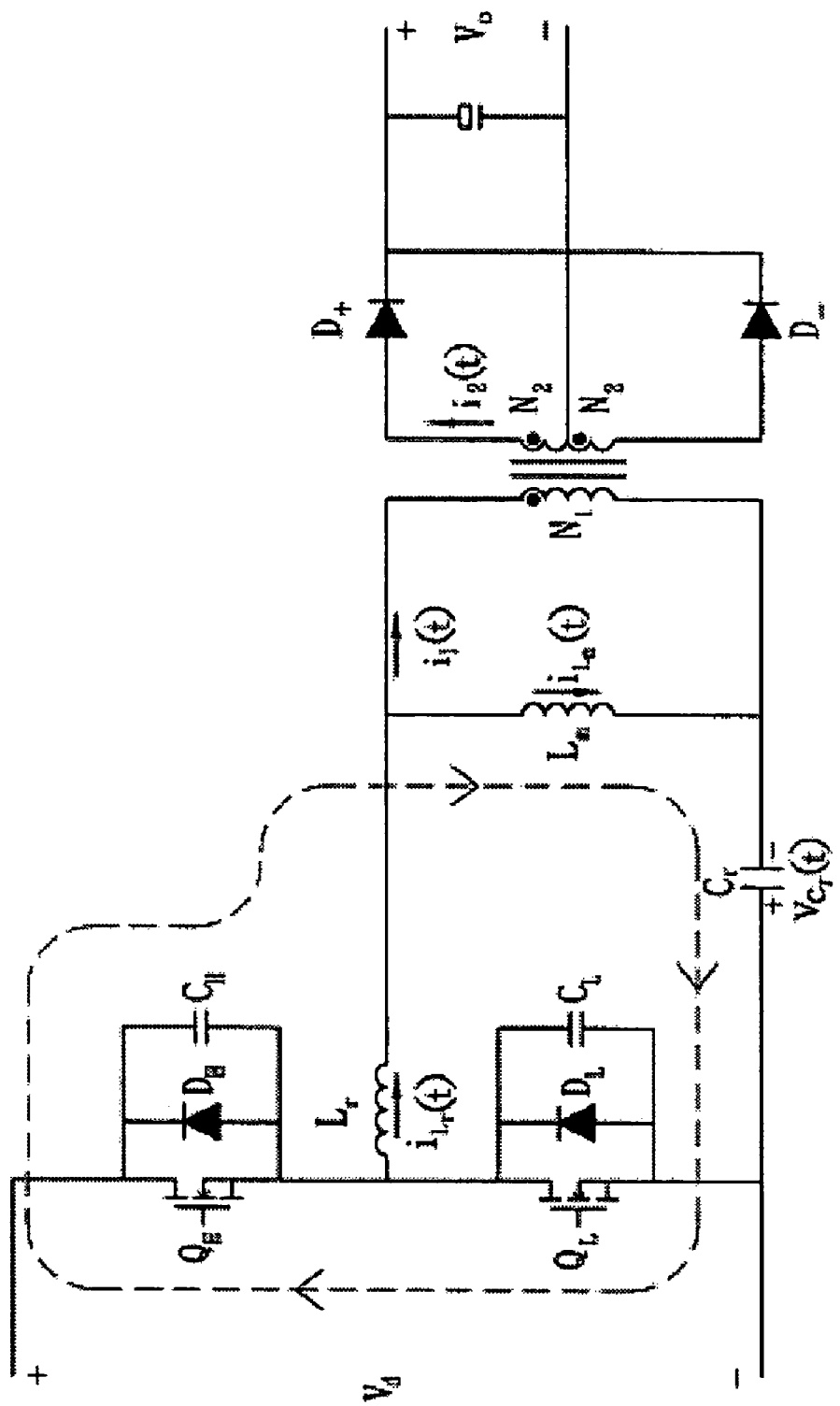
FIG. 6 is the current conduction circuit of the conventional half-bridge resonant converter in mode 3.

In the state of mode 3, as the resonant current $I_{Lr}$ and the magnetized current $I_{Lm}$ are equal, the primary side current $I_1$ will be 0 and the current waveform is shown in FIG. 6. The resonant inductance $L_r$ and the magnetized inductance $L_m$ are in series and resonant with the resonant capacitance $C_r$ and a current relation form can be obtained as follows:

$$\begin{cases} (L_r + L_m) \frac{di_{L_r}(t)}{dt} + v_{C_r}(t) = \frac{V_d}{2} \\ i_{L_r}(t_2) = I_2 \\ V_c(t_2) = V_2 \end{cases}$$

Further the current and the voltage equations of the resonant inductance $L_r$ and the resonant capacitance $C_r$ can be obtained as follows:

$$\begin{cases} i_{L_r}(t) = \left\{ I_2 \cos[\omega_{r2}(t-t_2)] + \frac{\frac{V_d}{2} - V_2}{Z_{02}} \sin[\omega_{r2}(t-t_2)] \right\} u(t-t_2) \\ v_{C_r}(t) = \left\{ \frac{V_d}{2} - \left(\frac{V_d}{2} - V_2\right) \cos[\omega_{r2}(t-t_2)] + I_2 Z_{02} \sin[\omega_{r2}(t-t_2)] \right\} u(t-t_2) \end{cases}$$

According to the above equation, the current and the voltage waveforms of the resonant inductance $L_r$ resonant capacitance $C_r$ from $t_0$ to $t_1$ can be obtained as shown in FIG. 3.

Wherein, as the resonant inductance $L_r$ and the magnetized inductance $L_m$ are in series and resonant with the resonant capacitance $C_r$, therefore a resonant frequency can be obtained as follows:

$$\omega_{r2} = \frac{1}{\sqrt{(Lr + Lm)Cr}}$$

and a characteristic resistance $Z_{02}$ can be obtained as follows:

$$Z_{02} = \sqrt{\frac{Lr + Lm}{Cr}}$$

Hence the current equation of the magnetized inductance $L_m$ can be derived as:

$$i_L{}^m(t) = i_{L_r}(t)$$

Further, according to the above equation, the current waveform of the magnetized inductance $L_m$ from $t_2$ to $t_3$ can be obtained as shown in FIG. 3, and the primary side current $I_1$ will be 0. As the secondary side current $I_2$ and the primary side current $I_1$ are in direct ratio, a relation can be obtained as follows:

$$I_2 = \frac{N_1}{N_2} I_1 = 0$$

As such, in the state of mode 3, the current of the resonant inductance $L_r$ and the magnetized inductance $L_m$ are all equal, and the slop is smaller than which in the state of mode 1 and mode 2:

$$\text{Slope}(I_{Lm}) = \frac{n \cdot Vo}{L_c + Lm}$$

When the transistor $Q_H$ of primary side is turned off, mode 3 will be terminated.

Figure 7:
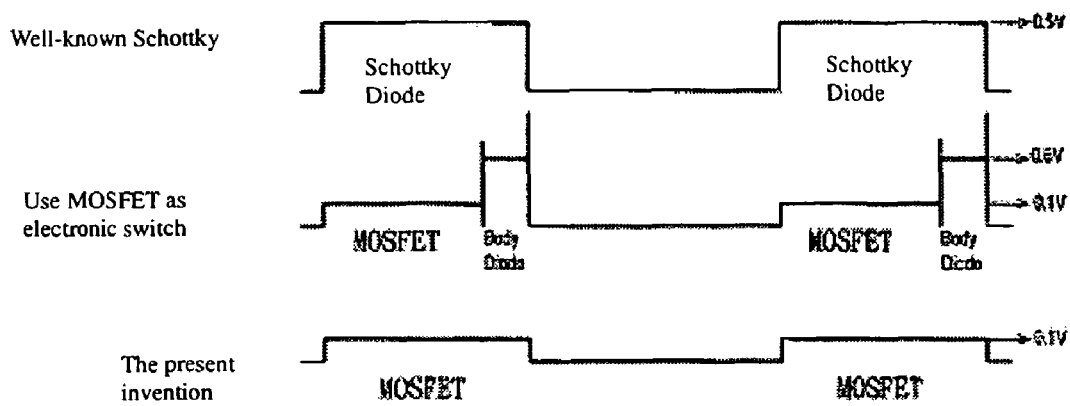
FIG. 7 is the conduction waveform of the element of the half-bridge resonant converter of the present invention and the conventional half-bridge resonant converter.
Figure 8:
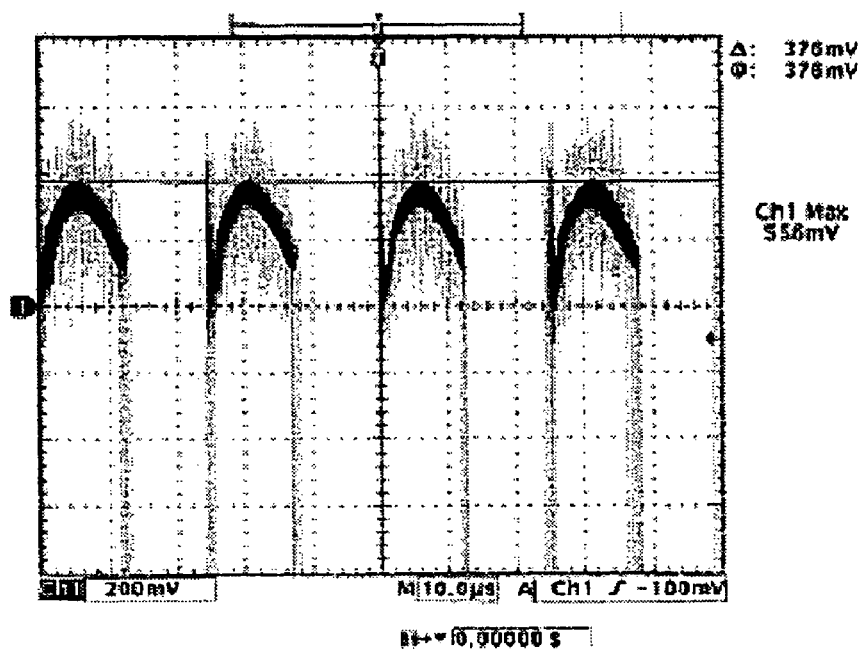
FIG. 8 is the loss current waveform as use of the Schottky Diode as the electronic switch diodes $D_+$ and $D_-$.

FIG. 7 shows the conducting status of the half-bridge resonant converter of the present invention and the conventional half-bridge resonant converter element. The diode $D_+$ and $D_-$ used in the circuit of the secondary winding of the conventional half-bridge resonant converter as the electronic switch will resulted in a considerable power loss. FIG. 8 shows the loss current waveform as use of the Schottky Diode as the electronic switch diodes $D_+$ and $D_-$, take the current of 16 A as an example, wherein if the Schottky Diode is a conventional Schottky Diode and the forward voltage drop is about 0.5V, therefore the power loss is about:

$$P_d = V_F \times I_O = 0.5 \times 16 = 8 \text{ W}$$

and wherein if the Schottky Diode is a low voltage drop type Schottky Diode and the forward voltage drop is about 0.3V, therefore the power loss is about:

$$P_d V_F \times I_O = 0.3 \times 16 = 4.8 \text{ W}$$

Figure 9:
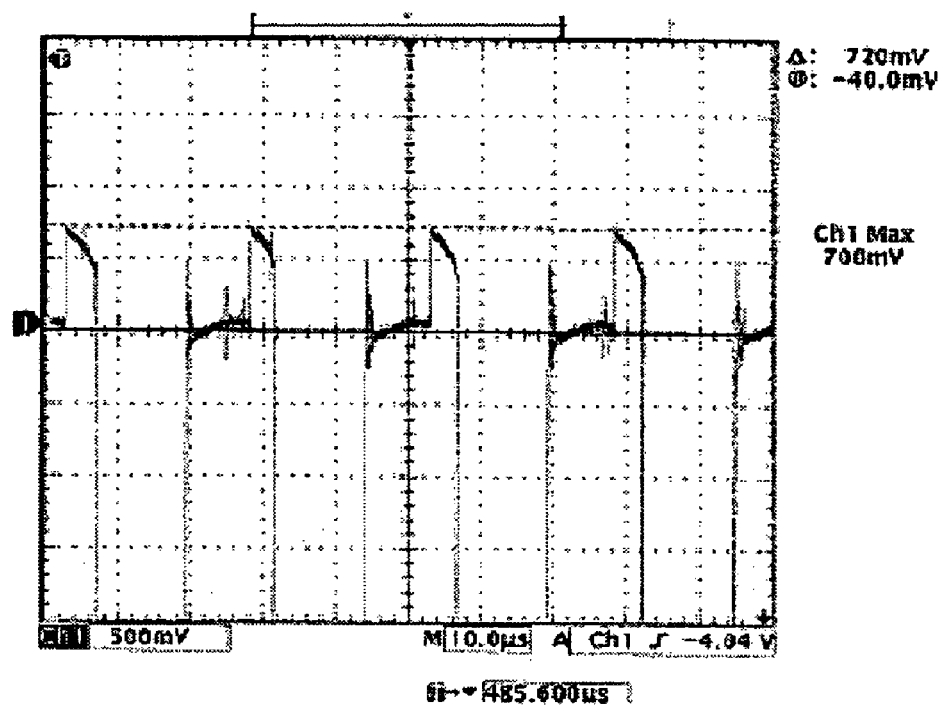
FIG. 9 is the loss current waveform as use of the MOSFET as the electronic switch diodes $D_+$ and $D_-$.

If the diodes $D_+$ and the $D_-$ are replaced by the MOSFET $Q_+$ and $Q_-$, the power loss will be reduced substantially. FIG. 9 shows the loss current waveform when using MOSFET to substitute the electronic switch diode $D_+$ and $D_-$, wherein the forward voltage drop when the MOSFET conducted is about 0.07V, and the voltage drop when the Body Diode conducted is about 0.6V, while the conduction time of the MOSFET is about twice than the conduction time of the Body Diode, therefore the power loss is about:

$$P_d = V_F \times I_O = 0.07 \times 16 \times \frac{2}{3} + 0.6 \times 16 \times \frac{1}{3} = 3.9W$$

Using the MOSFET to substitute the diodes as electronic switched will incur the problem of a reverse bias. In the state of mode 3, the secondary side current $I_2$ is 0, and V' and the $V_O$ have a voltage drop, thus may possibly cause the MOSFET generating a reverse bias, and then the reverse bias will cause the Body Diode to be conducted and incur the loss of electrical power raising substantially. Therefore, the present invention is to connect an power-storage element in series behind the electronic switch, and to use the filter inductance $L_+$ and $L_-$ to eliminate the voltage difference existing between V' and the $V_O$:

$$\frac{di_2(t)}{dt} = \frac{V_o - V'}{L_+}$$

Figure 10:
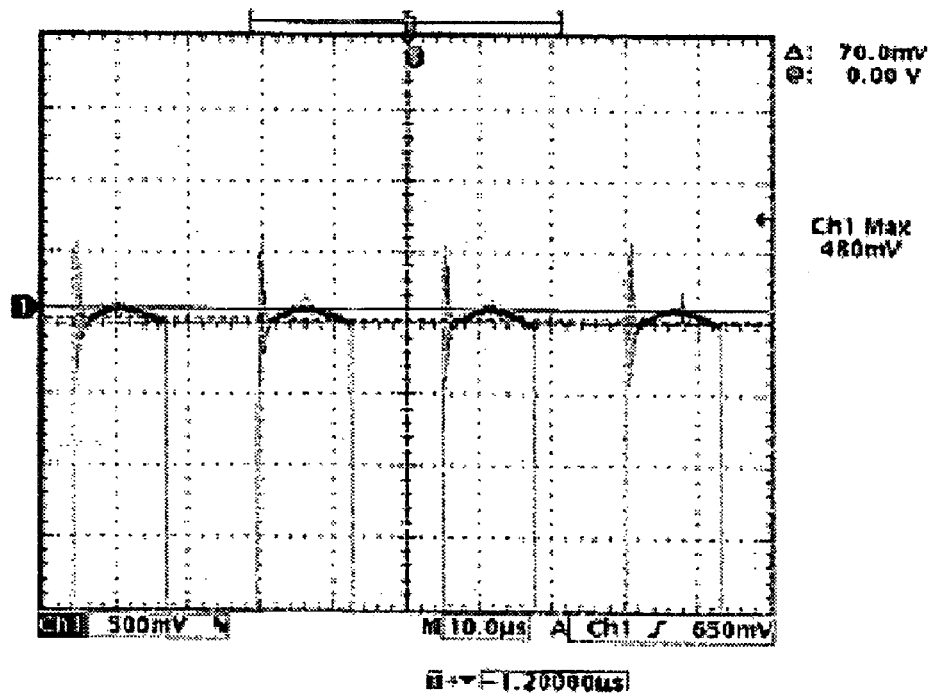
FIG. 10 is the loss current waveform of the half-bridge resonant converter of the present invention.

The resistance connected with the diode in series, $D_+$ serially connected with $R_+$ and $D_-$ serially connected with $R_-$, in the power-storage element forming a power release route of the filter inductance $L_+$ and the $L_-$. When mode 3 is terminated, the filter inductance $L_+$ and $L_-$ will release the power stored in the inductance via the power release route of $D_+$ serially connected with $R_+$ and $D_-$ serially connected with $R_-$. Thereby the half-bridge resonant converter of the present invention can overcome the problem that the reverse bias incurs the Body Diode conducted. FIG. 10 shows the loss current waveform of the half-bridge resonant converter of the present invention, wherein the forward voltage drop during the MOSFET conducted is about 0.07V, therefore its power loss is about:

$$P_d = V_F \times I_O = 0.07 \times 16 = 1.12 \text{ W}$$

According to the abovementioned comparison of the values of power loss, the half-bridge resonant converter of the present invention can reach the objective of lowest power loss.

While the invention has been described by way of examples and in terms of preferred embodiments, it is to be understood that the invention is not limited thereto. To the contrary, those who are familiar with the subject art can carry out various modifications and similar arrangements and procedures, under the scope of appended claims and broadest interpretation.

What is claimed is:

1. A half-bridge resonant converter, comprising:
   a primary winding;
   a secondary winding having a first and a second end, and a central point;
   a first electronic switch having a first and a second end, wherein said first end connects with the first end of said secondary winding;
   a second electronic switch having a first and a second end, wherein said first end connects with the second end of said secondary winding;
   a first power-storage element having a first and a second end, wherein said first end connects with the second end of said first electronic switch;
   a second power-storage element having a first and a second end, wherein said first end connects with the second end of said second electronic switch; and
   a load having a first and a second end, wherein said first end connects simultaneously with the second end of said first power-storage element and the second end of the second power-storage element, and said second end connects with the central point of said secondary winding.

2. The half-bridge resonant converter according to claim 1, wherein the action of said first electronic switch is in the reverse of said second electronic switch, and causes the first end or the second end of said secondary winding to conduct said load alternatively.

3. The half-bridge resonant converter according to claim 1, wherein said first electronic switch comprises a MOSFET and a third winding bridged with the Gate (G) and the Source (S) of said MOSFET, further the first end of said first electronic switch is the Source (S) of said MOSFET, and the second end is the Drain (D) of said MOSFET.

4. The half-bridge resonant converter according to claim 1, wherein said second electronic switch comprises a MOSFET and a third winding bridged with the Gate (G) and the Source (S) of said MOSFET, further the first end of the second electronic switch is the Source (S) of said MOSFET, and the second end is the Drain (D) of said MOSFET.

5. The half-bridge resonant converter according to claim 3, wherein the third winding of said first electronic switch and the third winding of said second electronic switch are the same windings with equal coil number.

6. The half-bridge resonant converter according to claim 1, wherein said first power-storage element is a combination of an inductance in parallel with a series connection of a diode and a resistance, so that the power of said inductance can be released through the series connection of said diode and said resistance, moreover the first end of said first power-storage element is the positive end of said diode, and the second end of said first power-storage element is the end of the combination of said resistance and said inductance.

7. The half-bridge resonant converter according to claim 1, wherein the second power-storage element is a combination of an inductance in parallel with a series of a diode and a resistance, so that the power of said inductance can be released through the series connection of said diode and said resistance, moreover the first end of said second power-storage element is the positive end of said diode, and the second end of said second power-storage element is the end of the combination of said resistance and said inductance.

* * * * *